US012288167B2

(12) United States Patent
Dai et al.

(10) Patent No.: US 12,288,167 B2
(45) Date of Patent: Apr. 29, 2025

(54) TYPHOON TRAJECTORY PREDICTION METHOD, DEVICE, ELECTRONIC EQUIPMENT AND COMPUTER READABLE MEDIUM

(71) Applicant: COSCO SHIPPING Technology (Beijing) Co., Ltd., Beijing (CN)

(72) Inventors: Yue Dai, Beijing (CN); Yaozuo Wang, Beijing (CN)

(73) Assignee: COSCO SHIPPING Technology (Beijing) Co., Ltd., Beijing (CN)

( * ) Notice: Subject to any disclaimer, the term of this patent is extended or adjusted under 35 U.S.C. 154(b) by 954 days.

(21) Appl. No.: 17/305,983

(22) Filed: Jul. 19, 2021

(65) Prior Publication Data

US 2022/0027761 A1  Jan. 27, 2022

(30) Foreign Application Priority Data

Jul. 21, 2020  (CN) .......................... 202010702538.2

(51) Int. Cl.
*G06N 5/04* (2023.01)
*B63B 49/00* (2006.01)
(Continued)

(52) U.S. Cl.
CPC ............... *G06N 5/04* (2013.01); *B63B 49/00* (2013.01); *B63B 79/10* (2020.01); *B63B 79/20* (2020.01); *G01W 1/10* (2013.01); *G08G 3/00* (2013.01)

(58) Field of Classification Search
CPC .......... G06N 5/04; B63B 79/20; B63B 49/00; B62B 79/10; G01W 1/10; G08G 3/00
See application file for complete search history.

(56) References Cited

U.S. PATENT DOCUMENTS

2009/0083263 A1* 3/2009 Felch ................... G11C 7/1039
707/999.005

FOREIGN PATENT DOCUMENTS

CN  101770516 A  7/2010
CN  103308050 A  9/2013
(Continued)

OTHER PUBLICATIONS

Miller, Robert J. et al., The Automated Tropical Cyclone Forecasting System (ATCF), Dec. 1990, Computer Technologies, American Meteorological Society, vol. 5, 653-660 (Year: 1990).*

(Continued)

*Primary Examiner* — Lisa M Caputo
*Assistant Examiner* — Emma Alexander
(74) *Attorney, Agent, or Firm* — Westman, Champlin & Koehler, P.A.

(57) ABSTRACT

Embodiments of the present disclosure disclose a typhoon trajectory prediction method, device, electronic equipment and computer readable medium. A detailed implementation of the method includes acquiring typhoon status information that includes typhoon wind speed information and typhoon location information, acquiring information of target distance from typhoon to a target position, obtaining typhoon time difference information based on the information of target distance and the typhoon wind speed information, performing slicing processing on the typhoon time difference information to generate time difference ratio information, performing data processing on the time difference ratio information and the information of target distance to generate time ratio distance information, and performing data processing on the time ratio distance information and the typhoon position information to generate typhoon position prediction information. The implementation realizes tar- (Continued)

geted prediction typhoon position information, thus enhancing the accuracy of broadcasting typhoon position.

15 Claims, 5 Drawing Sheets

(51) Int. Cl.
    *B63B 79/10*     (2020.01)
    *B63B 79/20*     (2020.01)
    *G01W 1/10*     (2006.01)
    *G08G 3/00*     (2006.01)

(56) References Cited

FOREIGN PATENT DOCUMENTS

| CN | 104599023 | A |   | 5/2015 |   |
|---|---|---|---|---|---|
| CN | 105488594 | A |   | 4/2016 |   |
| CN | 105575184 | A |   | 5/2016 |   |
| CN | 108229723 | A |   | 6/2018 |   |
| CN | 108446780 | A |   | 8/2018 |   |
| CN | 109190821 | A | * | 1/2019 | ............ G06Q 10/04 |
| CN | 109444989 | A |   | 3/2019 |   |
| CN | 109506880 | A |   | 3/2019 |   |
| CN | 110017838 | A |   | 7/2019 |   |
| CN | 111126718 | A |   | 5/2020 |   |
| EP | 2575120 | A2 |   | 4/2013 |   |
| EP | 111353217 | A |   | 6/2020 |   |
| JP | 2000155167 | A |   | 6/2000 |   |
| JP | 2003203300 | A |   | 7/2003 |   |
| JP | 2010066073 | A |   | 3/2010 |   |
| KR | 20150078725 | A |   | 7/2015 |   |

OTHER PUBLICATIONS

Full English Translation of: Wang, Jing-Quan et al., Design and Research for Intelligent Typhoon Evasion Systems for Ships, Oct. 2001, Korean Institute of Navigation and Port Research, Proceedings of the Korean Institute of Navigation Port Research Conference, 177-186 (Year: 2001).*

Applied Research on Marine Maneuvering Typhoon Avoidance System, Wang Jingquan et al. "Computer Simulation", Feb. 28, 2003, Issue 02 [Wang et al. "Design and Research for Intelligent Typhoon Evasion System for Ships", Computer Simulation, Feb. 28, 2003, pp. 5-10, vol. 20, No. 2].

Development and Utilization of Display and Plotting System for Northwest Pacific Tropical Cyclone on Board, Wang Xiangtao et al. "Ship and Ocean Engineering", Feb. 25, 2008, Issue 1 [Wang et al. Development and Utilization of the Display and Plotting System for the Northwest Pacific Tropical Cyclone on Board, Ship and Ocean Engineering, Feb. 25, 2008, pp. 103-106, vol. 37, No. 1].

General Law of Typhoon Movement, "Maritime Meteorology", China Communications Press, Maritime Meteorology Writing Group, Jun. 30, 1981 [Trial Teaching Materials for Higher Education, Maritime Meteorology: General Law of Typhoon Movement, China Communications Press, Jun. 30, 1981, pp. 91-92].

New Exploration of Technical Method for Ship to Avoid Typhoon, Lin Mingzhi et al. Meteorological Science and Technology, Dec. 30, 1999, Issue 04 [Lin et al. "New Exploration of Technical Method for Ship to Avoid Typhoon", Meteorological Science and Technology, Dec. 30, 1999, pp. 49-53, No. 4].

First Office Action in corresponding Chinese application No. 202010702538.2 dated Sep. 26, 2023.

Second Office Action in corresponding Chinese application No. 202010702538.2 dated Dec. 25, 2023.

* cited by examiner

TYPHOON TRAJECTORY PREDICTION METHOD, DEVICE, ELECTRONIC EQUIPMENT AND COMPUTER READABLE MEDIUM

CROSS REFERENCE TO RELATED APPLICATION(S)

This patent application claims the benefit and priority of Chinese Patent Application No. 202010702538.2, filed on Jul. 21, 2020, the disclosure of which is incorporated by reference herein in its entirety as part of the present application.

TECHNICAL FIELD

Embodiments of the present disclosure relate to the computer technical field, and more particularly, to a typhoon trajectory prediction method, a device, an electronic equipment, and a computer readable medium.

BACKGROUND ART

The typhoon moving direction given by the current typhoon trajectory prediction main data equally divides 360 degrees into 16 directions, each direction being 22.5 degrees; prediction is made by using this angle, and the azimuth range is large and has certain errors. It is expected to resolve the above problem; a curved surface distance is calculated by using the geographical latitude and longitude, and the true moving direction of typhoon is calculated by using the curved surface distance and the typhoon current latitude and longitude, to make the prediction result fit the reality more.

SUMMARY

Contents of the present disclosure introduce the concepts in brief form, and these concepts will be described in detail in the following detailed description of the embodiments. The contents of the present disclosure do not intend to identify the key features or necessary features of the technical solution sought for protection, nor intend to restrict the scope of the technical solution sought for protection.

Some embodiments of the present disclosure provide a typhoon trajectory prediction method, a device, an electronic equipment, and a computer readable medium, to solve the technical problem mentioned in the above BACKGROUND ART.

In the first aspect, some embodiments of the present disclosure provide a typhoon trajectory prediction method, the method comprises: acquiring typhoon status information, wherein the typhoon status information includes typhoon wind speed information and typhoon location information; acquiring information of target distance from typhoon to a target position; obtaining typhoon time difference information based on the information of target distance and the typhoon wind speed information; performing slicing processing on the typhoon time difference information to generate time difference ratio information; performing data processing on the time difference ratio information and the information of target distance to generate time ratio distance information; performing data processing on the time ratio distance information and the typhoon position information to generate typhoon position prediction information.

In the second aspect, some embodiments of the present disclosure provide a typhoon trajectory prediction device, and the device comprises: a first acquisition unit, configured to acquire typhoon status information, wherein the typhoon status information comprises typhoon wind speed information and typhoon position information; a second acquisition unit, configured to acquire information of target distance from typhoon to a target position; a determination unit, configured to obtain typhoon time difference information based on the information of target distance and the typhoon wind speed information; a first generation unit, configured to perform slicing processing on the typhoon time difference information to generate time difference ratio information; a second generation unit, configured to perform data processing on the time difference ratio information and the information of target distance to generate time ratio distance information; a third generation unit, configured to perform data processing on the time ratio distance information and the typhoon position information to generate typhoon position prediction information.

In the third aspect, embodiments of the present disclosure provide an electronic device, and the electronic device comprises: one or more processors; a storage device for storing one or more programs; when the one or more programs are executed by the one or more processors, the one or more processors implement the method described by any implementation of the first aspect.

In the fourth aspect, embodiments of the present disclosure provide a computer readable medium on which computer programs are stored; the computer programs implement the method described by any implementation of the first aspect when being executed by the processor.

An embodiment of the above embodiments of the present disclosure has the following advantageous effects: first, it can accurately determine the moving distance of the typhoon in the time ratio by acquiring the typhoon status information and the target distance. Thus, the typhoon position information in the time ratio distance can be predicted. Then, the typhoon position prediction information can be notified to ships at sea by being displayed on the screen or in the form of broadcast to avoid encounters with typhoons.

BRIEF DESCRIPTION OF THE DRAWINGS

The above and other features, advantages, and aspects of the embodiments of the above disclosure can be more obvious by combining with the accompanying drawings and by referring to the following implementations. Throughout the accompanying drawings, the same or similar reference signs denote the same or similar elements. It should be understood that the accompanying drawings are illustrative, and the elements and components are not drawn to scale.

DETAILED DESCRIPTION OF THE EMBODIMENTS

The following will describe the embodiments of the present disclosure by referring to the accompanying drawings in great detail. Though the accompanying drawings disclose some embodiments of the present disclosure, it should be understood that the present disclosure can be implemented in various forms, and should not be implemented as being restricted to the embodiments described herein. On the contrary, providing these embodiments is to understand the present disclosure more thoroughly and completely. It should be understood that the accompanying drawings and the embodiments of the present disclosure are merely for illustration, rather than restricting the protection scope of the present disclosure.

It should be explained additionally that for ease of description, the accompanying drawings merely illustrate the parts related to the invention. The embodiments and the features in the embodiments of the present disclosure can be combined with each other when they do not conflict.

It should be noted that expressions of "the first", "the second", "the third", and the like mentioned in the disclosure are merely for distinguishing different devices, modules or units, rather than restricting the sequence of the functions executed by the devices, modules or units or interdependence among them.

It should be noted that "one" or "more" mentioned in the present disclosure is schematic, rather than restrictive; those skilled in the art should understand that they should be understood as "one or more" unless clearly stated otherwise in the context.

The name of the messages or information interacted by the plural devices in the implementation of the present disclosure are merely for illustrative purpose, rather than restricting the scopes of the message or information.

The following will describe in great detail the present disclosure by referring to the accompanying drawings and by combining the embodiments.

Figure 1:
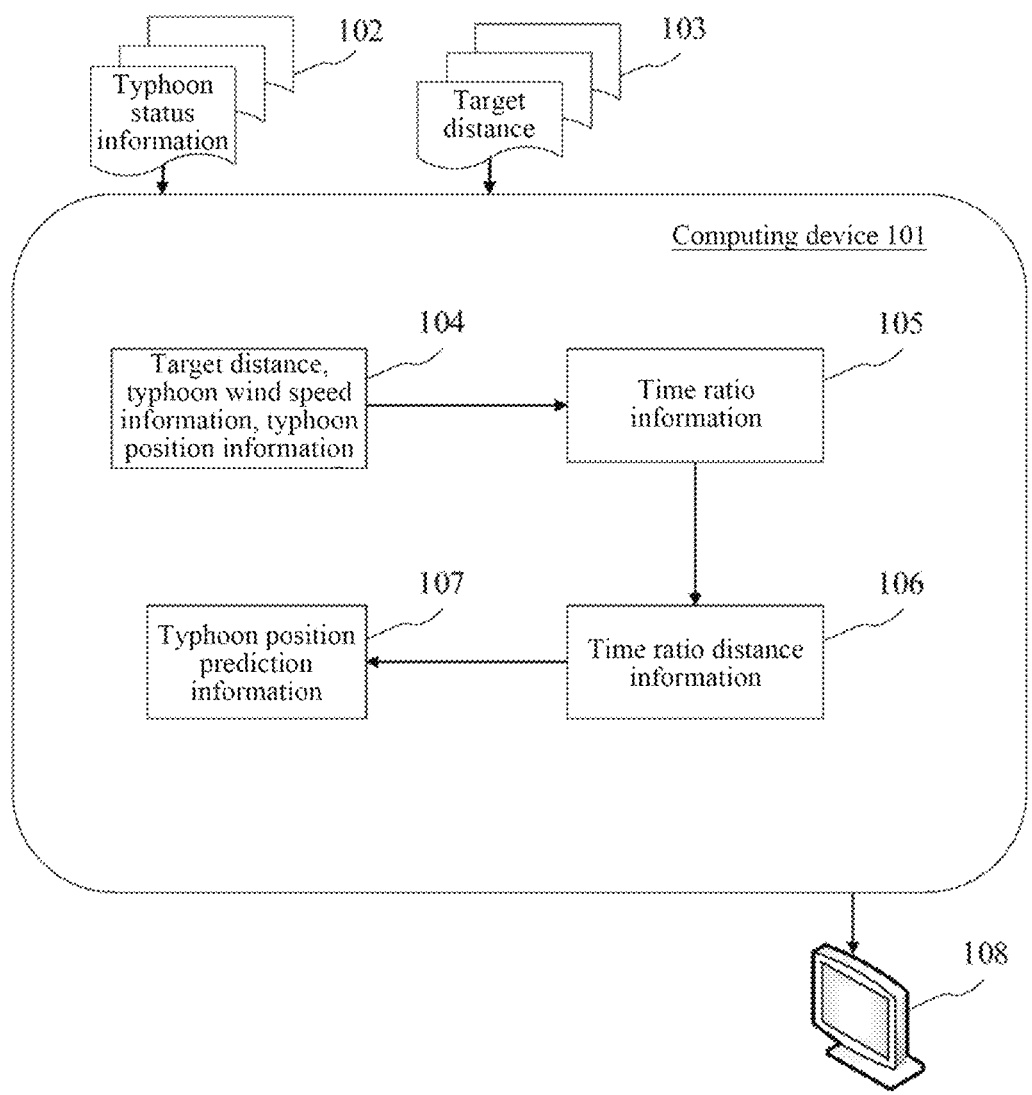
FIG. 1 is a schematic view of an application scenario of typhoon trajectory prediction method according to some embodiments of the present disclosure.

FIG. 1 is a schematic view of an application scenario of typhoon trajectory prediction method according to some embodiments of the present disclosure.

As shown in FIG. 1, first, the computing device 101 can determine a target distance, typhoon wind speed information, and typhoon position information 104 according to typhoon status information 102 and target distance 103. Then, the computing device 101 can perform data processing on the target distance, the typhoon wind speed information, the typhoon position information 104 to get time ratio information 105. Then, the computing device 101 can determine time ratio distance information 106 according to the time ratio information 105. Next, the computing device 101 can generate typhoon position prediction information 107 according to the target distance, the typhoon wind speed information, typhoon position information 104, and the time ratio distance information 106. Finally, optionally, the computing device 101 can output the typhoon position prediction information 107 to the output display screen 108.

It should be noted that the above computing device 101 may be hardware, or software. When the computing device is hardware, it can be implemented as a distributed cluster formed of a plurality of servers or terminal devices, or may be implemented as a single server or a single terminal device. When the computing device is implemented as software, it can be installed on the above listed hardware devices. It can be implemented as, for example, a plurality of software or software modules for providing distributed services, or be implemented as a single software or software module, which is not specifically defined here.

It should be understood that the number of user device information in FIG. 1 is merely schematic. According to implementation requirement, it may have any number of user device information.

Figure 2:
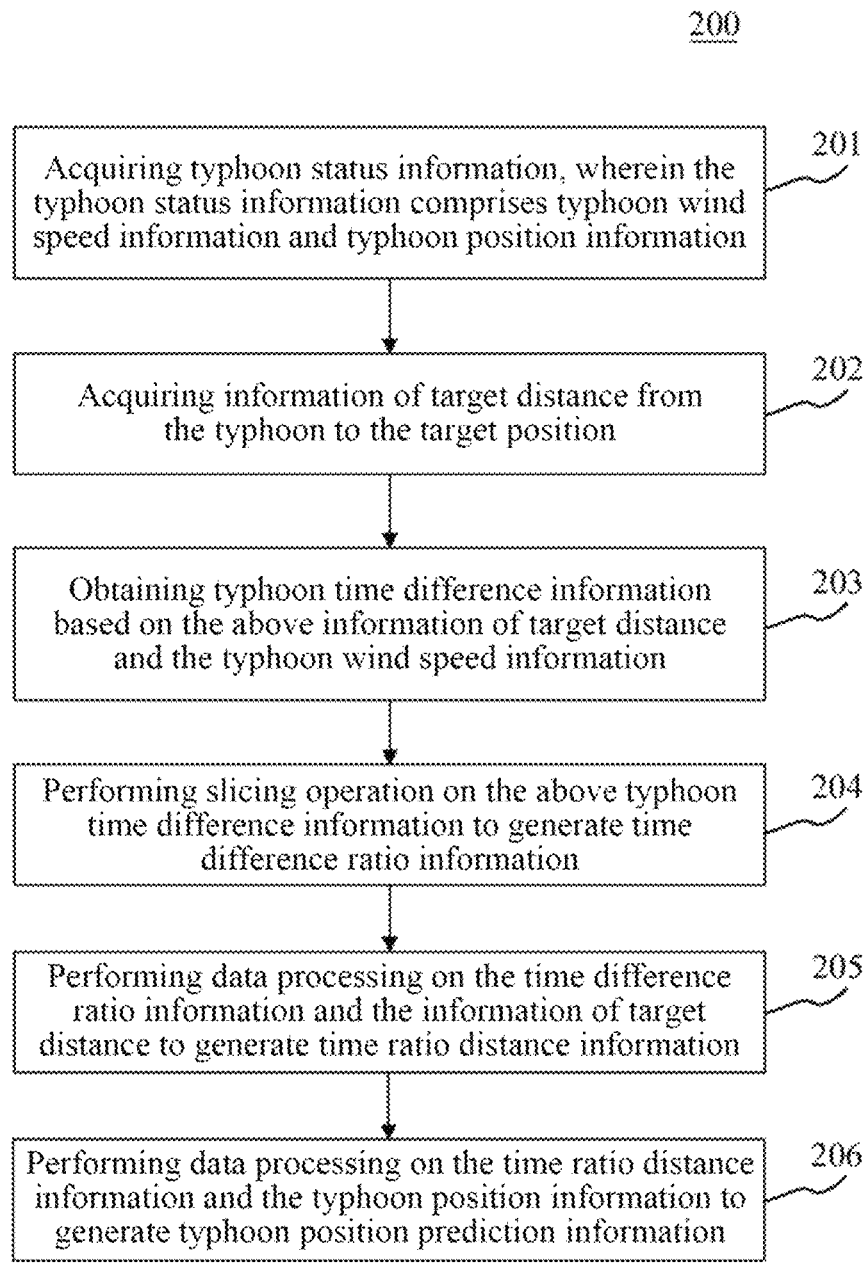
FIG. 2 is a flow chart of some embodiments of the typhoon trajectory prediction method according to some embodiments of the present disclosure.

Continue to refer to FIG. 2, it shows flow 200 according to some embodiments of the typhoon trajectory prediction method of the present disclosure. The above typhoon trajectory prediction method comprises the following steps:

Step 201: acquiring typhoon status information, wherein the typhoon status information comprises typhoon wind speed information and typhoon position information.

In some embodiments, the execution body (e.g., the computing device 101 as shown in FIG. 1) of the typhoon trajectory prediction method may acquire the typhoon status information from the terminal in a wired connection manner or a wireless connection manner. It should be pointed out that the above wireless connection manner may include but is not limited to 3G/4G/5G connection, WiFi connection, Bluetooth connection, WiMAX connection, Zigbee connection, UWB (ultra wideband) connection, and other wireless connection manners which are currently known or to be developed in future.

As an example, the above execution body may issue an application for acquiring the typhoon status information to the typhoon broadcast center through network; after the typhoon broadcast center receives the application, it transmits the typhoon status information to the above execution body through network. The typhoon status information may include but is not limited to at least one of the follows: typhoon level information, typhoon wind direction information, typhoon wind speed information, and typhoon position information.

Step 202: acquiring information of target distance from the typhoon to the target position.

In some embodiments, the execution body of the typhoon trajectory prediction method may acquire the information of target distance from the typhoon to the target position from the terminal in a wired connection manner or a wireless connection manner.

As an example, the above execution body may make an application for acquiring the information of target distance from the typhoon to the target position to the maritime map software through network; the maritime map software transmits the information of target distance to the above execution body through network after receiving the application. The information of target distance may include but is not limited to at least one of the follows: a target distance value and a target direction.

Step 203: obtaining typhoon time difference information based on the above information of target distance and the typhoon wind speed information.

In some embodiments, the above execution body may determine the target distance value according to the information of target distance. The above execution body may determine the typhoon wind speed value according to the typhoon wind speed information. The above execution body obtains a typhoon time difference value according to a ratio of the target distance value and the typhoon wind speed value, as the typhoon time difference information.

As an example, the information of target distance may be "Point A: 60 kilometers". The target distance value is "60 kilometers". The typhoon wind speed information may be "wind force: level 8; wind speed: 60 km/h". The typhoon wind speed value is "60 km/h". Division operation is performed on the above target distance value and the typhoon wind speed value to get that the typhoon time difference value is "1 hour", and then the time difference information is "time difference: 1 hour".

In some optional implementations of some embodiments, the above execution body may preset an update frequency of the typhoon time point, and determines the time stamps corresponding to each time point. Then, a difference value between each two time stamps is determined to obtain the typhoon time difference information.

Step 204: performing slicing operation on the above typhoon time difference information to generate time difference ratio information.

In some embodiments, the above execution body may set nodes for the typhoon time difference, and every 5 minutes is a time node. Then, the time difference value is converted into a time difference with second as the unit. The ratio between the above time node and the time difference is used as the time difference ratio information.

As an example, the above time difference information may be "time: 20 minutes". The time difference value is "1200 seconds". The time node is "300 seconds". The time difference ratio is "0.25". The time difference ratio information is "time difference ratio: 0.25".

Step 205: performing data processing on the time difference ratio information and the information of target distance to generate time ratio distance information.

In some embodiments, the execution body may multiply the above time difference ratio by the information of target distance to get the time ratio distance information; wherein the time ratio distance refers to the distance under the time ratio. For example, the time difference ratio may be "0.25", the target distance may be "50 km", and the time ratio distance is "12.5 km"; then, the time ratio distance information is "time ratio distance: 12.5 km".

Step 206: performing data processing on the time ratio distance information and the typhoon position information to generate typhoon position prediction information.

In some embodiments, the execution body may generate the typhoon position prediction information by the following steps:

First step: inputting the current latitude value, the time ratio distance, and the typhoon wind direction to a typhoon latitude prediction function, to get a typhoon latitude prediction value:

$$\varphi_2 = \varphi_1 + s * \cos C$$

Wherein $\varphi_2$ denotes a latitude prediction value, $\varphi_1$ denotes the current latitude value. s denotes a time ratio distance, and C denotes the typhoon wind direction, with a unit of °.

As an example, the current latitude value may be "34°16'". The time ratio distance may be "10 km". The typhoon wind direction may be "30°". The latitude prediction value is "42°82'". The typhoon latitude prediction value obtained by the above execution body is "42°82'".

In the second step, the current latitude value, the time ratio distance, the typhoon wind direction, the current latitude value, and the typhoon latitude prediction values are input into a typhoon longitude prediction function, to obtain a typhoon longitude prediction value:

$$\lambda_2 = \lambda_1 + \frac{s * \sin C}{\cos \frac{\varphi_1 + \varphi_2}{2}}$$

Wherein $\lambda_2$ denotes the typhoon longitude prediction value. $\lambda_1$ denotes the current longitude value. $\varphi_2$ denotes the latitude prediction value. $\varphi_1$ denotes the current latitude value. s denotes the time ratio distance. C denotes the typhoon wind direction, with a unit of °.

As an example, the current longitude value may be "112°42'". The latitude prediction value may be "42°82'". The current latitude value may be "34°16'". The time ratio distance may be "10 km". The typhoon wind direction may be "30°". The obtained longitude value is "119°60'". The typhoon longitude prediction value obtained by the execution body is "119°60'".

The above typhoon longitude prediction value and the typhoon latitude prediction value are combined to get the typhoon position prediction information.

An embodiment of the above embodiments of the present disclosure has the following advantageous effect: first, it can correct determine the moving distance of the typhoon under the time ratio by acquiring the typhoon status information and the target distance. Thus, it can generate the typhoon position information of the typhoon under the time ratio distance.

Figure 3:
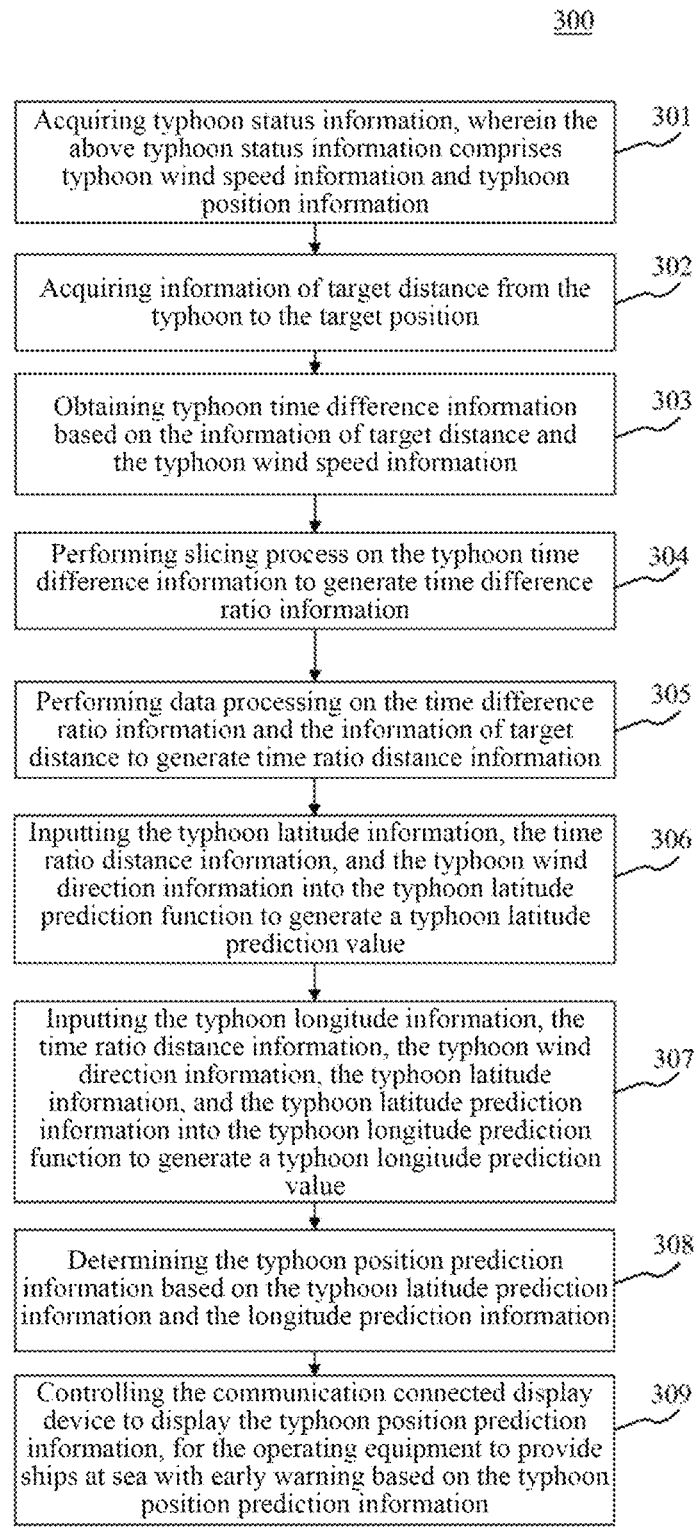
FIG. 3 is a flow chart of some other embodiments of the typhoon trajectory prediction method according to some embodiments of the present disclosure.

Further refer to FIG. 3, it shows a flow 300 according to some other embodiments of the typhoon trajectory prediction method of the present disclosure. The method can be performed by computing device 101 of FIG. 1. The typhoon trajectory prediction method comprises the following steps:

Step 301: acquiring typhoon status information, wherein the above typhoon status information comprises typhoon wind speed information and typhoon position information.

Step 302: acquiring information of target distance from the typhoon to the target position.

Step 303: obtaining typhoon time difference information based on the information of target distance and the typhoon wind speed information.

In some embodiments, for the specific implementation of steps 301-303 and the technical effects they bring, please refer to steps 201-203 in FIG. 2 corresponding to the embodiments, details omitted.

Step 304: performing slicing process on the typhoon time difference information to generate time difference ratio information.

In some embodiments, the above execution body may generate time difference ratio information from the time difference information by using the following equitation:

$$\alpha = \frac{5 * 60}{\Delta t}$$

Wherein $\alpha$ denotes time difference ratio; $\Delta t$ denotes a time difference value, with a unit of second.

As an example, the time difference value may be "600 seconds". The time difference ratio is "0.5". The time difference ratio information obtained by the above execution body is "time difference ratio: 0.5".

Step 305: performing data processing on the time difference ratio information and the information of target distance to generate time ratio distance information.

In some embodiments, the execution body may generate the above time ratio distance information from the time difference ratio information and the information of target distance by using the following equation:

$$\Delta x = \alpha * I_{AB}$$

Wherein $\Delta x$ denotes time ratio distance. $\alpha$ denotes time difference ratio. $I_{AB}$ denotes a target distance.

As an example, the time difference ratio may be "0.5". The target distance may be "20 km". It can be obtained that the time ratio distance is "10 km". The time ratio distance information is "time ratio distance: 10 km".

Step 306: inputting the typhoon latitude information, the time ratio distance information, and the typhoon wind direction information into the typhoon latitude prediction function to generate a typhoon latitude prediction value.

In some embodiments, the above execution body may input the typhoon latitude information, the time ratio distance information, and the typhoon wind direction information into a typhoon latitude prediction function to generate a typhoon latitude prediction value:

$$\varphi_2 = \varphi_1 + L*\cos C + M$$

Wherein $\varphi_2$ denotes a latitude prediction value. $\varphi_1$ denotes a current latitude value. L denotes the time ratio distance. C denotes the typhoon wind direction, with a unit of °. M denotes a latitude correction parameter.

As an example, the current latitude value may be "34°16'". The time ratio distance may be "10 km". The typhoon wind direction may be "30°'". The latitude correction parameter may be "5°32'". The above execution body gets that the typhoon latitude prediction value is "48°14'".

Step 307: inputting the typhoon longitude information, the time ratio distance information, the typhoon wind direction information, the typhoon latitude information, and the typhoon latitude prediction information into the typhoon longitude prediction function to generate a typhoon longitude prediction value.

In some embodiments, the execution body may input the typhoon longitude information, the typhoon wind direction information, the typhoon latitude information, and the typhoon latitude prediction information into the typhoon longitude prediction function to generate a typhoon longitude prediction value;

$$\lambda_2 = \lambda_1 + \left\{ \frac{10800}{\pi} \ln\left[\left(\frac{1-e\sin\varphi_2}{1+e\sin\varphi_2}\right)^{\frac{e}{2}} \tan\left(\frac{\pi}{4}+\frac{\varphi_2}{2}\right)\right] - \frac{10800}{\pi} \ln\left[\left(\frac{1-e\sin\varphi_1}{1+e\sin\varphi_1}\right)^{\frac{e}{2}} \tan\left(\frac{\pi}{4}+\frac{\varphi_1}{2}\right)\right] \right\} * \tan C$$

Wherein, $\lambda_2$ denotes a longitude prediction value. $\lambda_1$ denotes a current longitude value. $\varphi_2$ denotes a latitude prediction value. $\varphi_1$ denotes a current latitude value. e denotes a parameter with a value of 0.81819. C denotes a typhoon wind direction, with a unit of °.

As an example, the typhoon wind direction may be "30°'". The current latitude value may be "27°30'". The current longitude value may be "106°47'". The predicated latitude value is "89°04'". It can be obtained that the typhoon longitude prediction value is "−177°94'".

Step 308: determining the typhoon position prediction information based on the typhoon latitude prediction information and the longitude prediction information.

In some embodiments, the execution body may combine the typhoon latitude prediction value with the longitude prediction value to form a binary group, so as to determine the typhoon position prediction information. For example, the typhoon latitude prediction value may be "89°04'". The typhoon longitude prediction value may be "−177°94'". Then the typhoon position prediction information is "(−177°94', 89°04')".

Step 309: controlling the communication connected display device to display the typhoon position prediction information, for the operating equipment to provide ships at sea with early warning based on the typhoon position prediction information.

In some embodiments, the execution body may control the communication connected display device to display the typhoon position prediction information, for the operating equipment to provide ships at sea with early warning based on the typhoon position prediction information.

An embodiment of the above respective embodiments of the present disclosure has the following advantageous effect: first, by acquiring the typhoon status information and the target distance, it can correctly determine the moving direction of the typhoon under the time ratio. Thus, it can predict the typhoon position information of the typhoon under the time ratio distance. The above execution body can notify the ships at sea the typhoon position prediction information through the display or broadcast, so as to avoid encounters with the typhoon.

Figure 4:
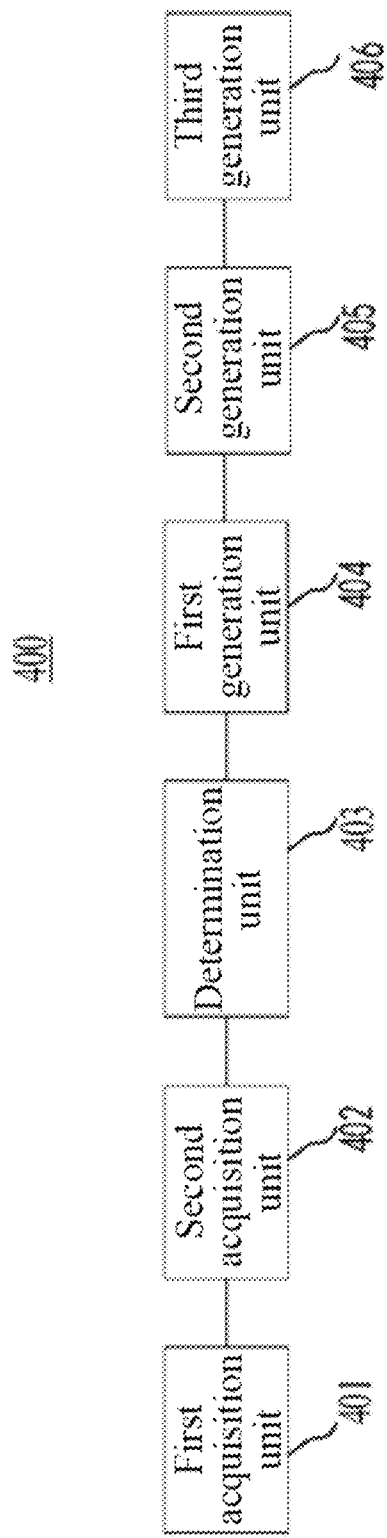
FIG. 4 is a flowchart of some embodiments of the typhoon trajectory prediction device according to some embodiments of the present disclosure.

By further referring to FIG. 4, as the implementation of the above method of the above FIGS., the present disclosure provides some embodiments of the typhoon trajectory prediction device, and the device embodiments correspond to method embodiments of the FIG. 2. The device can be specifically applied into various electronic devices.

As shown in FIG. 4, the typhoon trajectory prediction device 400 of some embodiments include: a first acquisition unit 401, a second acquisition unit 402, a determination unit 403, a first generation unit 404, a second generation unit 405, and a third generation unit 406. Wherein the first acquisition unit 401 is configured to acquire the typhoon status information, wherein the typhoon status information comprises typhoon wind speed information and typhoon position information. The second acquisition unit 402 is configured to acquire information of target distance from the typhoon to the target position. The determination unit 403 is configured to obtain the typhoon time difference information based on the information of target distance and the typhoon wind speed information. The first generation unit 404 is configured to perform slicing processing on the typhoon time difference information to generate time difference ratio information. The second generation unit 405 is configured to perform data processing on the time difference ratio information and the information of target distance to generate time ratio distance information. The third generation unit 406 is configured to perform data processing on the time ratio distance information and the typhoon position information to generate typhoon position prediction information.

In some optional implementations of some embodiments, the determination unit 403 of the typhoon trajectory prediction device 400 is further configured to: determine a target distance value according to the information of target distance; determine a typhoon wind speed value according to the typhoon wind speed information; obtain typhoon time difference value based on a ratio of the target distance value and the typhoon wind speed value as the typhoon time difference information.

It can be understood that the units recorded in device 400 correspond to the respective steps in the method described by referring to FIG. 2. Thus, the operations and features described for the method and the generated advantageous effects in the above text also apply to device 400 and the units contained therein, details omitted here.

Figure 5:
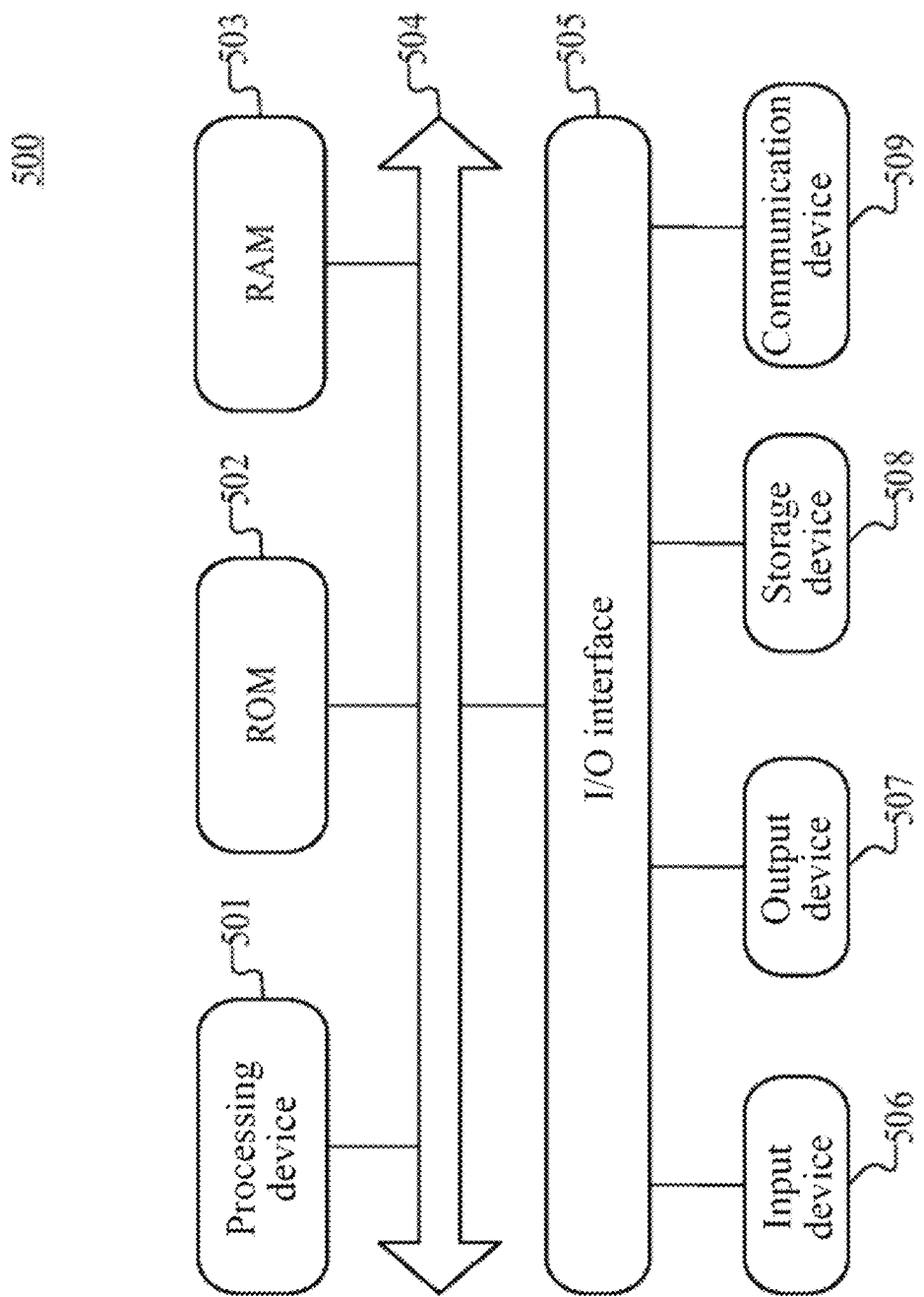
FIG. 5 is a structural diagram of an electronic device suitable for implementing some embodiments of the present disclosure.

Now refer to FIG. 5, it shows a structural schematic view of an electronic device (e.g., computing device 101 in FIG. 1) suitable to implement some embodiments of the present disclosure. The server illustrated in FIG. 5 is merely an example, and should not bring any restriction to the functions and scope of use of the embodiments of the present disclosure.

As shown in FIG. 5, the electronic device 500 may include a processing device (e.g., a central processing unit, a graphics processing unit, etc.) 501, which can execute various proper actions and processes according to the programs stored in the read-only memory (ROM) 502 or the programs loaded from the storage device 508 to the random access memory (RAM) 503. In RAM 503, there are also stored various programs and data required by the operation of the electronic device 500. The processing devices 501, ROM 502, and the RAM 503 can be connected to each other through a bus 504. The input/output (I/O) interface 505 can also be connected to the bus 504.

Usually, the following devices can be connected to the I/O interface 505: an input device 506 comprising, for example, a touch screen, a touch panel, a keyboard, a mouse, a camera, a microphone, an accelerometer, and a gyro, etc.; an output device 507 comprising, for example, a liquid crystal display (LCD), a loud speaker, a vibrator; a storage device 508 comprising, for example, tape and hard drive; and a communication device 509. The communication device 509 may allow the electronic device 506 to make wired or wireless communication with other devices to exchange data. Though FIG. 5 illustrates an electronic device 500 with various equipment, it should be understood that it does not require implementing or having all the illustrated equipment. It may alternatively implement or have more or less devices. Each block illustrated in FIG. 5 may represent a device, or represent plural devices as required.

In particular, according to some embodiments of the present disclosure, the process described above with reference to the flowchart may be implemented as a computer software program. For example, some embodiments of the present disclosure include a computer program product, which includes a computer program carried on a computer-readable medium, and the computer program contains program code for executing the method illustrated in the flowchart. In some such embodiments, the computer program may be downloaded and installed from the network via the communication device 509, or installed from the storage device 508, or installed from the ROM 502. When the computer program is executed by the processing device 501, the above-mentioned functions defined in the methods of some embodiments of the present disclosure are executed.

It should be noted that the above-mentioned computer-readable medium in some embodiments of the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, equipment, device, or a combination of any of the above. More specific examples of computer-readable storage media may include, but are not limited to: electrical connections with one or more wires, portable computer disks, hard disks, random access memory (RAM), read-only memory (ROM), erasable Programmable read only memory (EPROM or flash memory), optical fiber, portable compact disk read only memory (CD-ROM), optical storage device, magnetic storage device, or any suitable combination of the above. In some embodiments of the present disclosure, the computer-readable storage medium may be any tangible medium that contains or stores a program, and the program may be used by or in combination with an instruction execution system, apparatus, or device. In some embodiments of the present disclosure, the computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable medium other than the computer-readable storage medium, and the computer-readable signal medium can send, propagate, or transmit the program for use by or in combination with the instruction execution system, apparatus, or device. The program code contained on the computer-readable medium can be transmitted by any proper medium, including but not limited to: wire, optical cable, RF (Radio Frequency), etc., or any suitable combination of the above.

In some embodiments, the client and server can communicate with any currently known or future to be developed network protocol such as HTTP (HyperText Transfer Protocol), and can communicate (e.g., communication network) and interconnect with digital data in any form or medium. Examples of communication networks include local area networks ("LAN"), wide area networks ("WAN"), internet (e.g., the Internet), and end-to-end networks (e.g., ad hoc end-to-end networks), as well as any currently known or future to be researched and developed networks.

The above-mentioned computer-readable medium may be included in the above-mentioned apparatus; or it may exist alone without being assembled into the electronic device. The computer readable medium carries one or more programs, and when the one or more programs are executed by the electronic device, the electronic device is made to: obtain typhoon status information, wherein the typhoon status information includes typhoon wind speed information and typhoon location information; obtain the information of target distance from the typhoon to the target location; obtain the typhoon time difference information based on the information of target distance and the typhoon wind speed information; perform slicing processing on the typhoon time difference information to generate time difference ratio information; perform data processing on the time difference ratio information and the information of target distance to generate time ratio distance information; perform data processing on the time ratio distance information and the typhoon position information to generate typhoon position prediction information.

The computer program code used to perform the operations of some embodiments of the present disclosure can be written in one or more programming languages or a combination thereof. The above-mentioned programming languages include object-oriented programming languages such as Java, Smalltalk, C++, Python, and also includes conventional procedural programming languages-such as "C" language or similar programming languages. The program code can be executed entirely on the user's computer, partly on the user's computer, executed as an independent software package, executed partly on the user's computer and partly on a remote computer, or entirely executed on the remote computer or server. In the case of a remote computer, the remote computer can be connected to the user's computer through any kind of network, including a local area network ("LAN") or a wide area network (WAN), or it can be connected to an external computer (for example, using an Internet service provider to connect via the Internet).

The flowcharts and block diagrams in the accompanying drawings illustrate the architecture, functions, and operations possible to be implemented by the system, method, and computer program product according to various embodiments of the present disclosure. In this regard, each block in the flowchart or block diagram may represent a module, program segment, or part of code, and the module, program segment, or part of code contains one or more executable instructions for realizing the specified logic function. It should also be noted that, in some alternative implementations, the functions marked in the block may also occur in a different order from the order marked in the drawings. For example, two blocks represented in succession actually can be executed in parallel substantially, or sometimes they can be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations, or it can be realized by a combination of dedicated hardware and computer instructions.

The units described in some embodiments of the present disclosure may be implemented in software or hardware. The described unit can also be provided in the processor, for example, it can be described as: a processor includes a first acquisition unit, a second acquisition unit, a determination unit, a first generation unit, a second generation unit, and a third generation unit. Among them, the names of these units do not constitute restriction for the unit itself under certain circumstances. For example, the second generation unit can also be described as "a unit for performing data processing on the time difference ratio information and the information of target distance to generate time ratio distance information".

The functions described hereinabove may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD) and so on.

The above description is only some preferred embodiments of the present disclosure and explanations of the applied technical principles. Those skilled in the art should understand that the scope of the invention involved in the embodiments of the present disclosure is not limited to the technical solution formed of the specific combination of the above technical features, and meanwhile should also cover other technical solutions formed of any combination of the above-mentioned technical features or their equivalent features without departing from the above-mentioned inventive concept, for example, the technical solution formed of the above-mentioned features and the technical features disclosed in the embodiments of the present disclosure (but not limited to) having similar functions which are replaced with each other.

What is claimed is:

1. A typhoon trajectory prediction method, comprising:
   acquiring typhoon status information, wherein the typhoon status information includes typhoon wind speed information and typhoon location information;
   acquiring information of target distance from typhoon to a target position;
   obtaining typhoon time difference information based on the information of target distance and the typhoon wind speed information;
   performing slicing processing on the typhoon time difference information to generate time difference ratio information;
   performing data processing on the time difference ratio information and the information of target distance to generate time ratio distance information;
   performing data processing on the time ratio distance information and the typhoon position information to generate typhoon position prediction information; and
   sending a notification containing at least a portion of the typhoon position prediction information to a ship;
   wherein performing data processing on the time ratio distance information and the typhoon position information to generate typhoon position prediction information comprises;
   determining typhoon longitude information and typhoon latitude information according to the typhoon position information;
   determining typhoon wind direction information according to the typhoon position information;
   inputting the typhoon latitude information, the time ratio distance information, and the typhoon wind direction information into a typhoon latitude prediction function to generate a typhoon latitude prediction value as the typhoon latitude prediction information: $\varphi_2=\varphi_1+L*\cos C+M$ wherein $q_2$ denotes a typhoon latitude prediction value, $\varphi_1$ denotes a current latitude value, L denotes a time ratio distance, C denotes a typhoon wind direction, with unit of °, M denotes a latitude correction function;
   inputting the typhoon longitude information, the typhoon wind information, the typhoon latitude prediction information, and the typhoon latitude prediction information into a typhoon longitude prediction function to generate a typhoon longitude prediction value as typhoon longitude prediction information:

$$\lambda_2 = \lambda_1 + \left\{ \frac{10800}{\pi} \ln\left[ \left( \frac{1 - e\sin\varphi_2}{1 + e\sin\varphi_2} \right)^{\frac{e}{2}} \tan\left( \frac{\pi}{4} + \frac{\varphi_2}{2} \right) \right] - \frac{10800}{\pi} \ln\left[ \left( \frac{1 - e\sin\varphi_1}{1 + e\sin\varphi_1} \right)^{\frac{e}{2}} \tan\left( \frac{\pi}{4} + \frac{\varphi_1}{2} \right) \right] \right\} * \tan C$$

wherein $\lambda_2$ denotes a longitude prediction value,: $\lambda_1$ denotes a current longitude value, $\varphi_2$ denotes a typhoon latitude prediction value, $\varphi_1$ denotes a current typhoon latitude value, e denotes a parameter with a value of 0.081819, C denotes a typhoon wind direction, with a unit of °; and
   generating the typhoon position prediction information based on the typhoon latitude prediction information and the typhoon longitude prediction information.

2. The method according to claim 1, wherein obtaining typhoon time difference information based on the information of target distance and the typhoon wind speed information comprises:
   determining a target distance value according to the information of target distance;
   determining a typhoon wind speed value according to the typhoon wind speed information; and
   obtaining a typhoon time difference value as typhoon time difference information based on a ratio between the target distance value and the typhoon wind speed value.

3. The method according to claim 2, wherein performing slicing processing on the typhoon time difference information to generate time difference ratio information comprises:
    slicing the time difference information by using the following equation to generate time difference ratio information:

$$\alpha = \frac{5*60}{\Delta t},$$

wherein α denotes time difference ratio,
Δt denotes a time difference value, with a unit of second.

4. The method according to claim 3, wherein performing data processing on the time difference ratio information and the information of target distance to generate time ratio distance information comprises:
    generating the time ratio distance information from the time difference ratio information and the information of target distance by using the following equation:
    $\Delta x = \alpha * I_{AB}$, wherein Δx denotes time ratio distance, α denotes time difference ratio, and $I_{AB}$ denotes a target distance.

5. The method according to claim 1, wherein the method further comprises:
    controlling a communication connected display device to display the typhoon position prediction information for an operating equipment to provide early warning to ships at sea based on the typhoon position prediction information.

6. An electronic device, comprising:
    one or more processors; and
    a storage device on which one or more programs are stored;
    when the one or more programs are executed by the one or more processors, the one or more processors implement the method according to claim 1.

7. The electronic device according to claim 6, wherein obtaining typhoon time difference information based on the information of target distance and the typhoon wind speed information comprises:
    determining a target distance value according to the information of target distance;
    determining a typhoon wind speed value according to the typhoon wind speed information; and
    obtaining a typhoon time difference value as typhoon time difference information based on a ratio between the target distance value and the typhoon wind speed value.

8. The electronic device according to claim 7, wherein performing slicing processing on the typhoon time difference information to generate time difference ratio information comprises:
    slicing the time difference information by using the following equation to generate time difference ratio information:

$$\alpha = \frac{5*60}{\Delta t},$$

wherein α denotes time difference ratio,
Δt denotes a time difference value, with a unit of second.

9. The electronic device according to claim 8, wherein performing data processing on the time difference ratio information and the information of target distance to generate time ratio distance information comprises:
    generating the time ratio distance information from the time difference ratio information and the information of target distance by using the following equation:
    $\Delta x = \alpha * I_{AB}$, wherein Δx denotes time ratio distance, α denotes time difference ratio, and $I_{AB}$ denotes a target distance.

10. The electronic device according to claim 6, wherein the method implemented further comprises:
    controlling a communication connected display device to display the typhoon position prediction information for an operating equipment to provide early warning to ships at sea based on the typhoon position prediction information.

11. A non-transitory computer readable medium on which computer programs are stored, which, when executed by the processor, implement the method according to claim 1.

12. The non-transitory computer readable medium according to claim 11, wherein obtaining typhoon time difference information based on the information of target distance and the typhoon wind speed information comprises:
    determining a target distance value according to the information of target distance;
    determining a typhoon wind speed value according to the typhoon wind speed information; and
    obtaining a typhoon time difference value as typhoon time difference information based on a ratio between the target distance value and the typhoon wind speed value.

13. The non-transitory computer readable medium according to claim 12, wherein performing slicing processing on the typhoon time difference information to generate time difference ratio information comprises:
    slicing the time difference information by using the following equation to generate time difference ratio information:

$$\alpha = \frac{5*60}{\Delta t},$$

wherein α denotes time difference ratio,
Δt denotes a time difference value, with a unit of second.

14. The non-transitory computer readable medium according to claim 13, wherein performing data processing on the time difference ratio information and the information of target distance to generate time ratio distance information comprises:
    generating the time ratio distance information from the time difference ratio information and the information of target distance by using the following equation:
    $\Delta x = \alpha * I_{AB}$, wherein Δx denotes time ratio distance, α denotes time difference ratio, and $I_{AB}$ denotes a target distance.

15. The non-transitory computer readable medium according to claim 11, wherein the method further comprises:
    controlling a communication connected display device to display the typhoon position prediction information for an operating equipment to provide early warning to ships at sea based on the typhoon position prediction information.

* * * * *